June 12, 1956

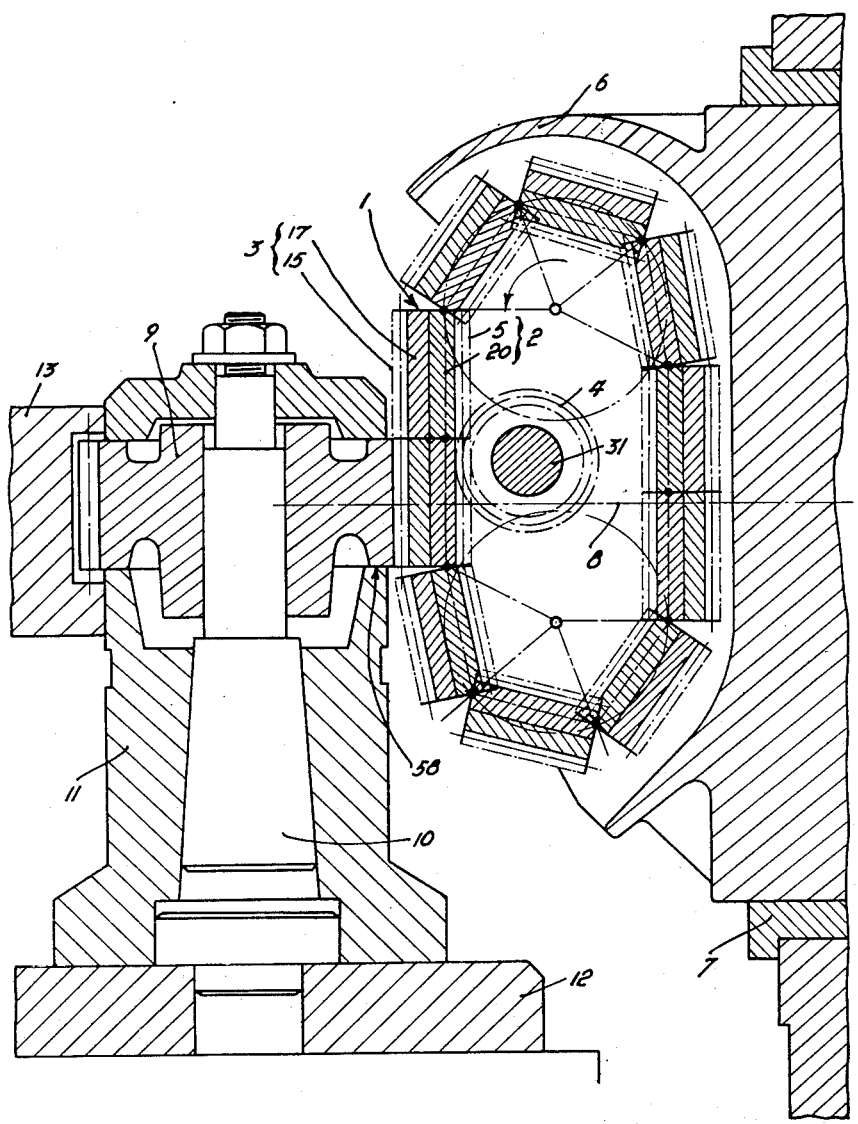

R. N. DAOÛT 2,749,804

DEVICE FOR CUTTING GEAR TEETH AND GROOVES OR
SPLINES BY THE GENERATING PROCESS

Filed June 20, 1952

INVENTOR:
ROBERT NICOLAS DAOÛT
BY:

June 12, 1956  R. N. DAOÛT  2,749,804
DEVICE FOR CUTTING GEAR TEETH AND GROOVES OR
SPLINES BY THE GENERATING PROCESS
Filed June 20, 1952  6 Sheets-Sheet 5

INVENTOR:
ROBERT NICOLAS DAOÛT
BY:

June 12, 1956  R. N. DAOÛT  2,749,804
DEVICE FOR CUTTING GEAR TEETH AND GROOVES OR
SPLINES BY THE GENERATING PROCESS
Filed June 20, 1952  6 Sheets-Sheet 6

INVENTOR:
ROBERT NICOLAS DAOÛT
BY:

United States Patent Office 2,749,804
Patented June 12, 1956

2,749,804

DEVICE FOR CUTTING GEAR TEETH AND GROOVES OR SPLINES BY THE GENERATING PROCESS

Robert Nicolas Daoût, Meudon, France

Application June 20, 1952, Serial No. 294,595

Claims priority, application France June 22, 1951

4 Claims. (Cl. 90—3)

My invention relates to devices for cutting gear teeth and grooves or splines by the generating process, thanks to which a number of cutting and generating members can be made to act simultaneously along one and the same generatrix of the revolving blank to be cut and in synchronism with it, the said cutting and generating members being parallel with and tangential to the said revolving blank along the said generatrix.

The principal object of my invention is to provide a device which causes the said cutting-generating members to succeed each other, so that a group of the said members is constantly carrying out its cutting action of the surface of the blank to be cut and the complete cutting operation can be carried out continuously without alternating displacements of the cutting tools as a whole and, consequently, without any idle time due to the return movement.

With this principal object in view, my invention consists according to its broadest aspect in a cutting device comprising, on the one hand, a continuous cutting chain carrying cutting and generating members, for instance in the form of a rack with a profile corresponding to that of the teeth to be cut, arranged parallel with each other, preferably at regular intervals, the said cutting chain being so arranged as to be capable of having a continuous movement imparted to it, the path of which comprises at least one plane part, and, on the other hand, driving means ensuring the said continuous cutting movement of the cutting chain, the rotating movement of the blank to be cut round its axis, the relative traverse or radial feed movement of the said cutting chain and the blank to be cut in the orthogonal direction in relation to the said plane part of the path of the cutting movement, and the traverse or tangential feed movement of the said cutting members parallel to the said plane part of the path, and ensuring the travel of the generating members over the blank to be cut, and finally kinematic connecting components between the drive of the cutting chain and the drive of the blank to be cut having an axis parallel with the path of the cutting members in the said plane part of the said path.

A further object of my invention is to provide a cutting chain for cutting device according to my invention, said cutting chain being constituted by a series of links articulated to each other and provided with a driving means—a rack, for instance—on which the said cutting members are mounted, preferably so as to be adjustable transversely in relation to the chain.

For a more detailed understanding of my invention, reference will be had to the accompanying drawings illustrating a number of embodiments. However the invention is not to be construed as limited to the particular construction and use chosen for illustration but that various changes and modifications may be made therein without departing from the spirit and scope of the invention as defined in the appended claims.

In the drawings:

Fig. 1 is a sectional view of the cutting device covered by the invention, on a plane running through the axis of the blank to be cut;

Figure 6:
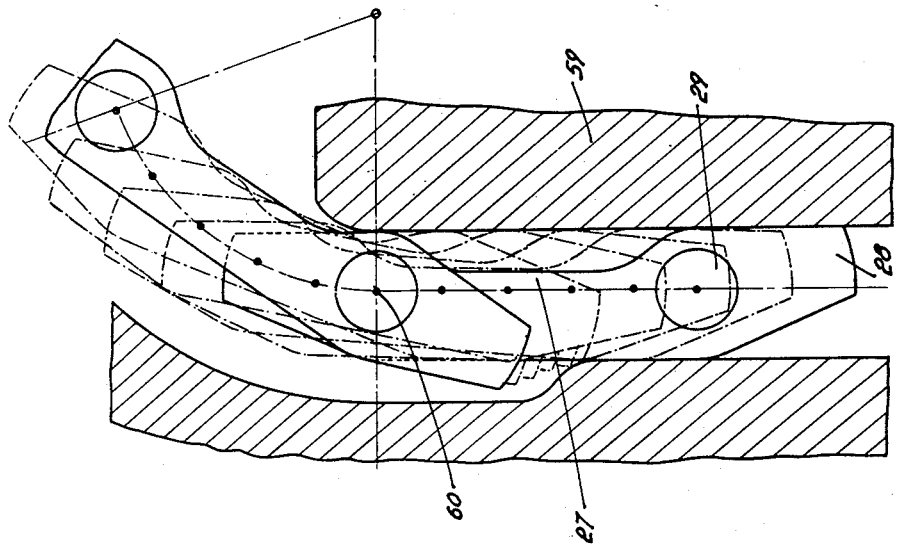
Fig. 6 is a view, on a larger scale, of the lateral arms of a link in a series of successive positions inside its guide slide.
Figure 2:
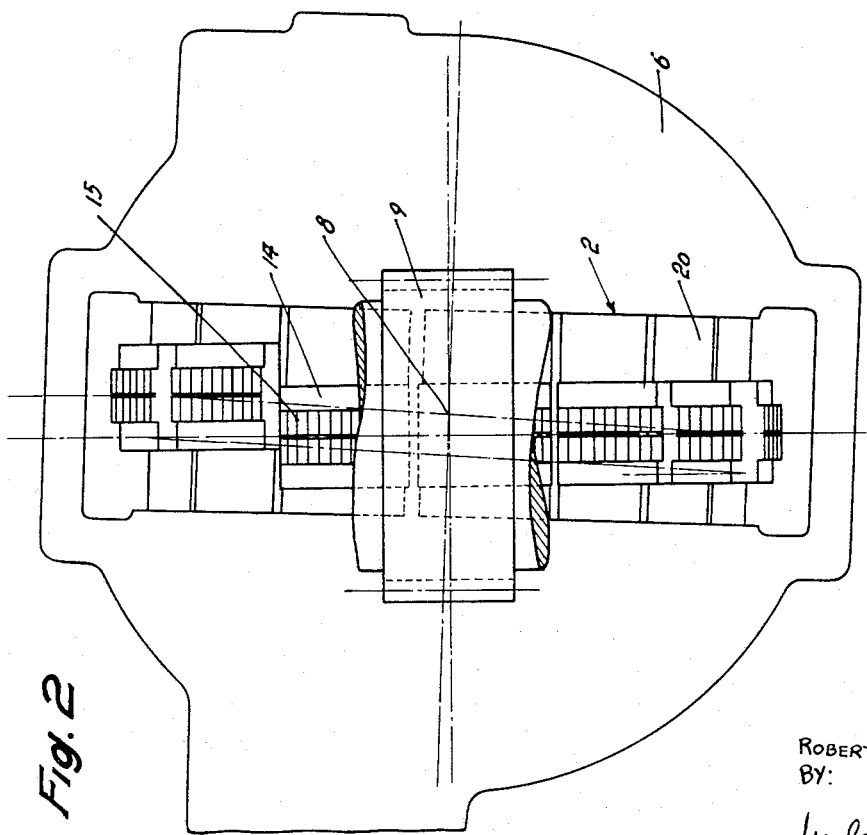
Fig. 2 is an end view of the movable head carrying the cutting chain, the angle of the cutting members to the axis of the chain being very much exaggerated.
Figure 3:
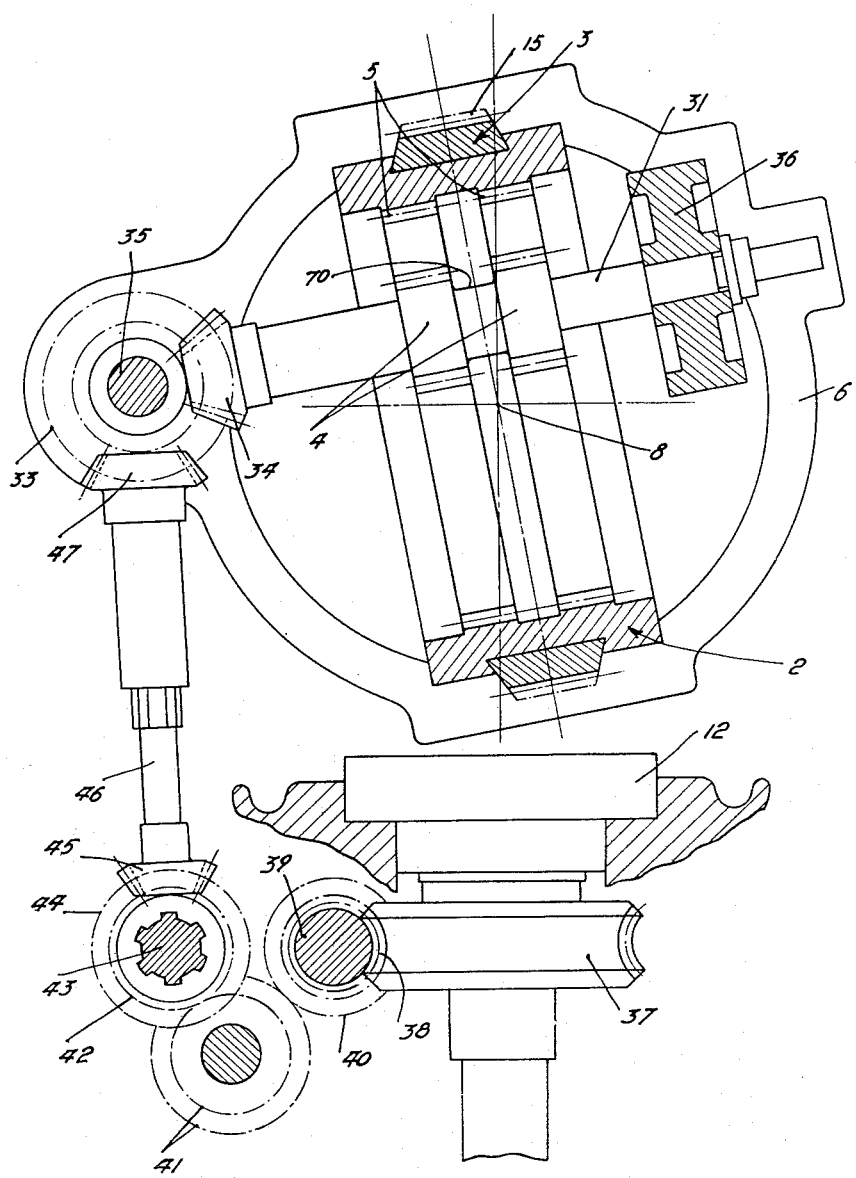
Fig. 3 is an elevation, with partial cross-sections, of the cutting device as a whole.
Figure 4:
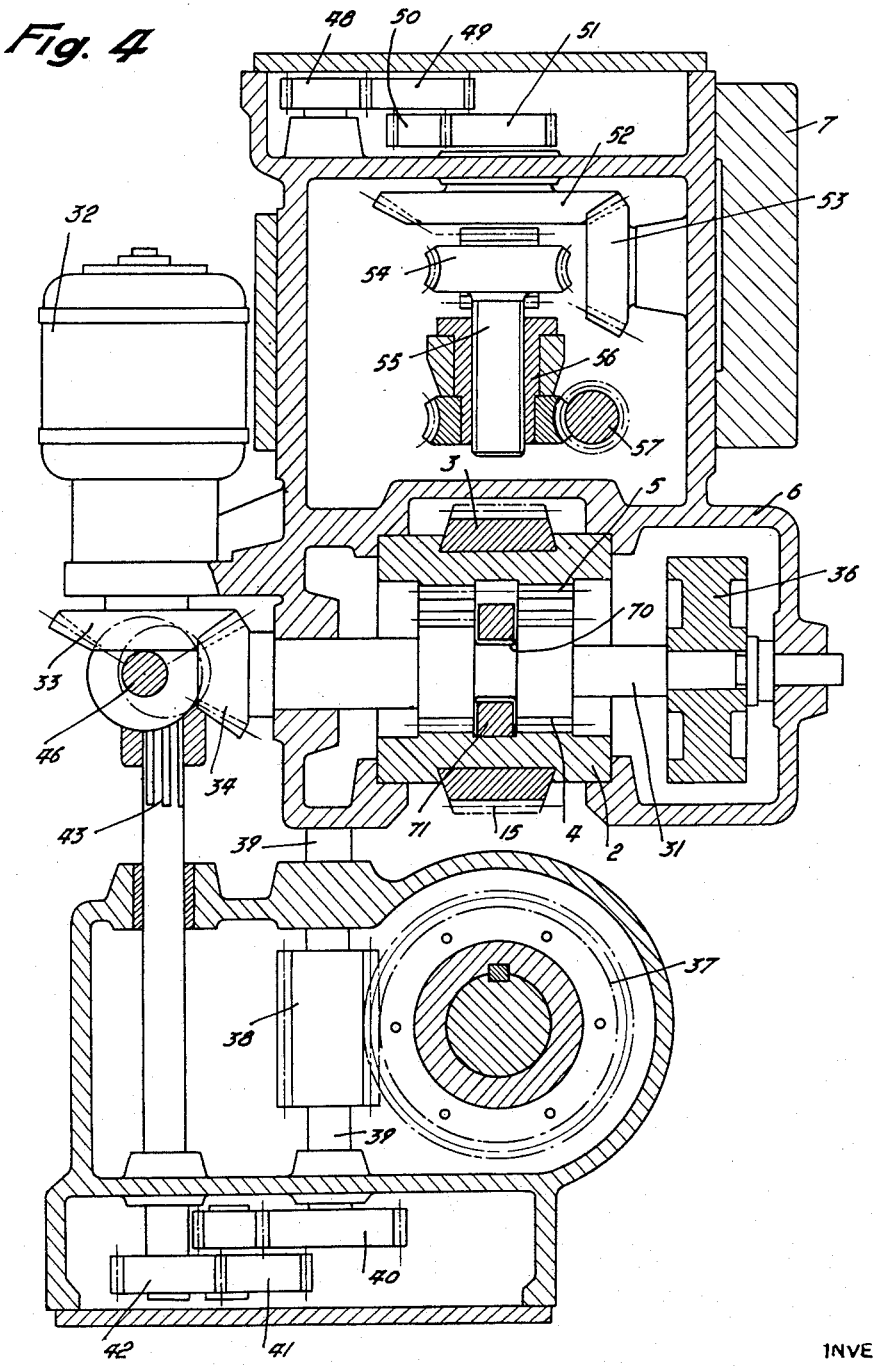
Fig. 4 is a sectional view of the cutting device according to Fig. 3, as a whole, on a plane which is orthogonal to the axis of the blank to be cut.

In the embodiment shown in Figs. 1 to 9, the cutting device as a whole comprises essentially a closed cutting chain 1, constituted by rack links 2, carrying the cutting edges 3 of blades with generating profile, articulated together.

This cutting chain 1 is driven by a sprocket wheel 4, the teeth of which engage with the teeth of the racks 5 provided on the links 2. The chain 1 is mounted on a swivel head 6 which can rotate inside a bearing 7 round an axis 8; and to which can be imparted a movement of traverse or advance, also along the same axis.

The blank to be cut, 9, in this case assumed to be a spur pinion, is mounted, through a centering key 10, on a support 11 which, in turn, rests on a swivelling plate 12; a stop 13 serves to take up the radial thrust exercised on the support 11.

Figure 5:
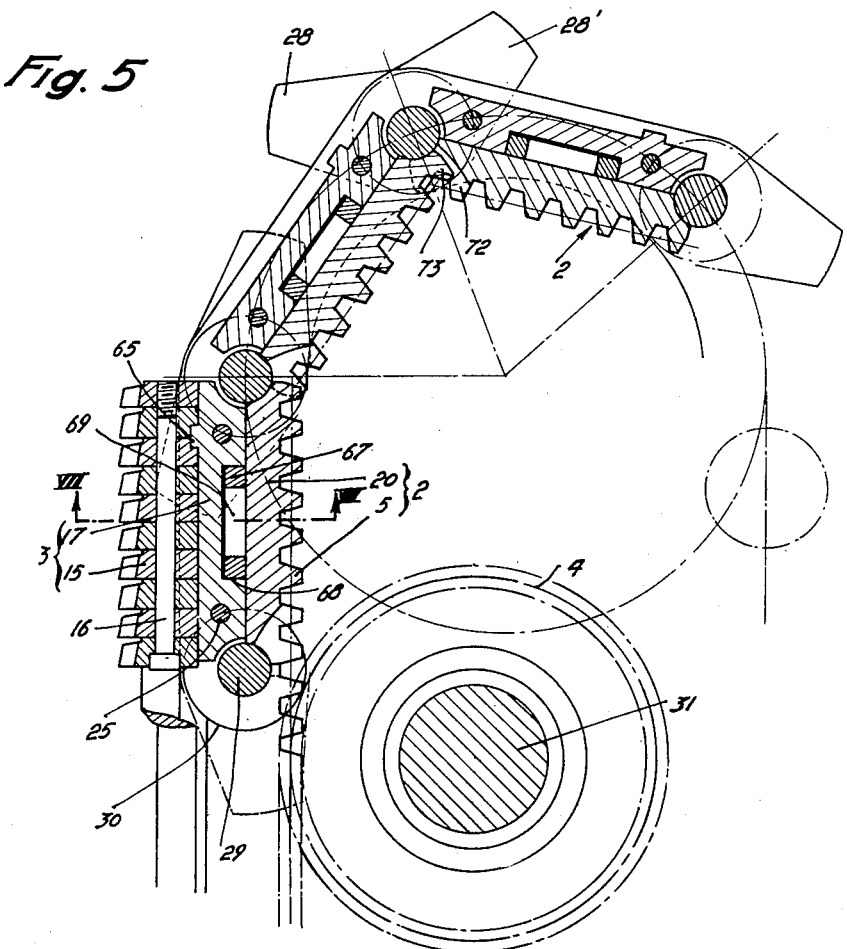
Fig. 5 is a sectional view of a part of the cutting chain on a larger scale.

Each of the parts 3 of the cutting chain 1 is constituted by a block of ten identical blades 15 cut in a rack and assembled by three bolts 16. This block of 10 blades, 15, is mounted on a plate 17 by being held between a stop bar 14 and five double clamps 61 with swivel heel, the bar 14 being supported on the plate 17 by the heel 62 and fixed on it by the screws 19, while the clamps 61 bear on the plate 17 by means of the heels 63 and are fixed on the said plate by the screws 18. The stresses on the blade block 15 are transmitted to the plate 17 by the heels 64 (Fig. 8) and 65 (Fig. 5).

The plate 17, in its turn, is mounted on the base plate 20 of the link 2 by being held between the wedging keys 21 with a bevelled cylindrical body, and the tightening clamps 23. The keys 21 and the clamps 23 are supported on the sides 66 of the links 2 (Fig. 9) and are jointed to the base plate 20 by the pins 22 and the screws 24 respectively.

Screw stops 25, the length of which can be adjusted before the components 15 and 17 are put in place, bear on the flanks 66 of the link 2, so that it is possible to set the said components 15 and 17 with great accuracy at the correct angle to the axis of the link 2 and the locking screws 26.

Figure 9:
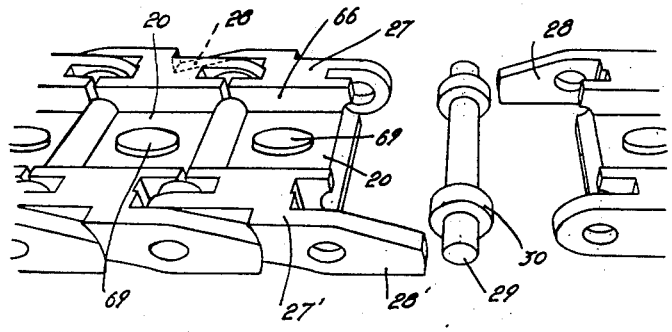
Fig. 9 is a perspective view, split up, of a group of successive links of the cutting chain.
Figure 7:
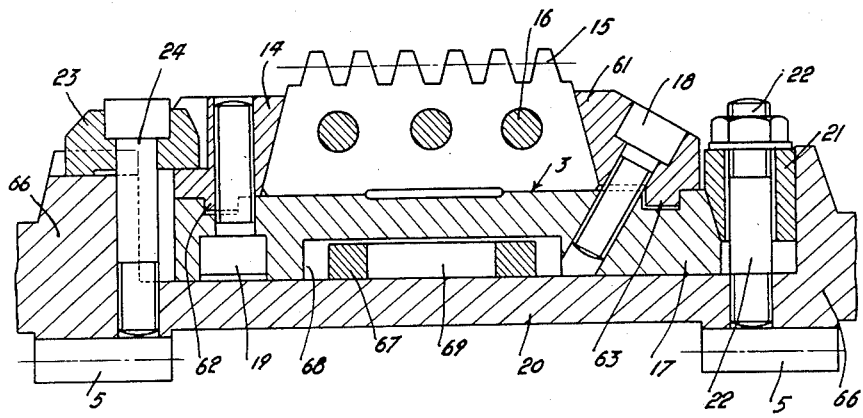
Fig. 7 is a sectional view, along the line VII—VII of Fig. 5 and Fig. 8, of a component of the cutting chain.
Figure 8:
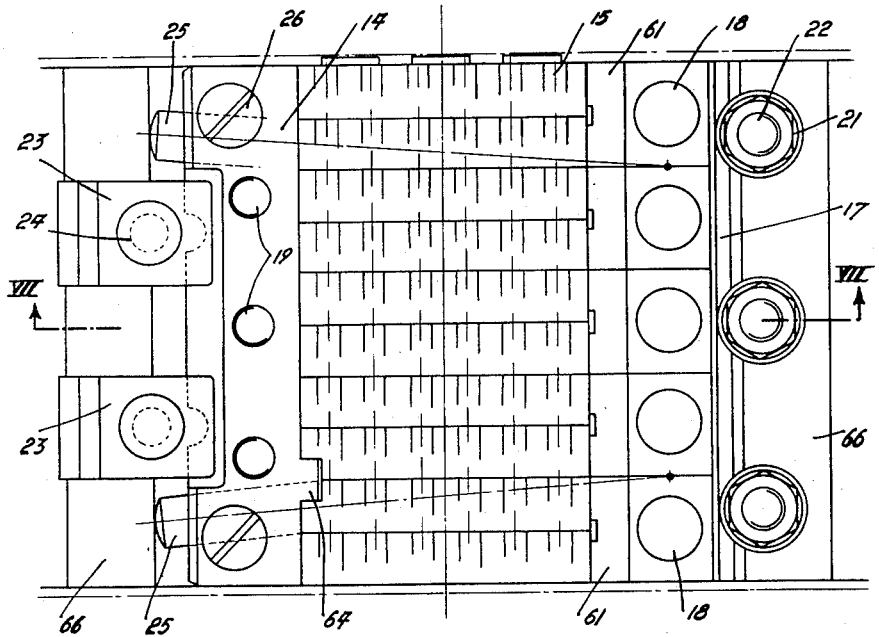
Fig. 8 is a plane view of a link and the corresponding cutting members of the cutting chain according to Fig. 5.

The stresses borne by the plate 17 are transmitted to the link 2 by a bearing bush 67 housed in a rectangular groove 68 in the plate 17 and capable of rotating on a pivot 69 cast in a single piece with the link 2 (Fig. 9).

Each of the links 2 (Figs. 5 and 9), the base plate 20 of which carries rack teeth 5, is articulated to the adjoining links by lateral arms 27, 27', one end of which has an extension 28, 28' with a flat base, and which are arranged symmetrically with the approximate centre of the plate 20; this articulation takes place around rods 29 provided with runner wheels 30 which engage with suitable runways in the movable head 6. Thanks to the special shape of the arms 27, 27' and their arrangement, the length of the ride of the links 2 in the slides provided in the straight part of the path (Fig. 6) is substantially equal to twice the pitch of the articulation.

As has already been stated, the cutting movement of the cutting chain 1 is imparted by the pinion 4. This solid driving pinion 4 is pierced with a groove 70 to enable it to pass in a line with a stop block 71 (Fig. 4) placed opposite the blank to be cut, and against which the cutting chain 1 bears during the cutting operation. It is owing to the existence of this stop 71 that the rack 5 of the links 2 has to be interrupted.

So that the articulation between two links can close in the curved part of the cutting chain path, one of the halves of the rack 5 is interrupted in the front part 72 of the link, while the other half is interrupted at the rear part 73.

The pinion 4 is keyed on to the driving shaft 31 rotating in bearings of the movable head 6 and itself driven through the shaft 35 and the bevel gear 33, 34 by the motor 32 fitted with a gear box and fixed on the head 6; a flywheel, 36, is mounted on the shaft 31.

The blank carrying plate 12 (Fig. 3) and with it the pinion to be cut, 9, is made to rotate round its axis by the motor 32 through the kinematic chain formed by the wormwheel 37, the wormscrew 38 keyed on shaft 39, the pinions 40, 41 and 42, the splined shaft 43, the bevel reduction gear 44, 45, the sliding transmission shaft 46 and the bevel gear 47, 33.

The radial forward movement of the movable head 6 is ensured by the shaft 39, the driving pinion 48, the idler pinions 49, 50, 51, the bevel gear 52, 53, the wheel and tangent screw gear 54 and the threaded shaft 55 engaging with the fixed tapped part 56 integral with a part of the housing which projects inside an opening pierced in the head 6. The quick feed return movement is ensured by the wheel and tangent screw gear 57 and a separate motor not shown in the drawing.

As described above, the position of the plates 17 carrying the cutting blades 15 can be adjusted by means of the keys 21, the clamps 23 and the stops 25, the said adjustment being made in such a manner that the various groups of cutting components are aligned on each link at a certain angle (see Fig. 2) to the longitudinal axis of the said carrying link, that is to say, to the path. This angle of slope must be such that if we assume that the chain 1 has been cut and unfolded, the outside blades will be transversely displaced in relation to each other by a whole multiple of the pitch of the teeth of the said blades, in general by the pitch of one or possibly of two teeth so that, once the chain is reassembled and mounted, they will constitute a sort of screw with one or more threads.

The operation of the device thereupon immediately results from the foregoing:

The pinion to be cut 9 (or a pile of pinions of the same diameter) being placed on the swivelling plate 12 by means of the supporting mount 11, the movable head 6 is rotated round the axis 8 so as to slope it correctly in relation to the axis of the pinion 9, for instance, for a straight-toothed or spur pinion (Fig. 2) at an angle equal to the angle of slope of the cutting components 14, 15, in relation to the longitudinal axis of the links 20.

The motor 32 is started up and it brings about simultaneously the rapid cutting movement, by engagement of the teeth 5 of the links 20 with the pinion 4, through the gear 33, 34 and the shaft 31, the rotating movement of the blank to be cut, 9, round its axis, by engagement of the crown 37 and the screw 38, through the gear 33, 47, of the shaft 46, the gear 45, 44 of the shaft 43, the idler pinions 42, 41, 40 and of the shaft 39; finally, the radial forward movement of the cutting chain towards the axis of the blank 9, by the feed shaft 39, the idler pinions 48, 49, 50, 51, the gear 52, 53, the crown 54 and the screw 55.

When the forward movement is ended, the rotation of the screw driven by a separate motor permits of bringing the head 6 back quickly to its initial position, ready for a new cutting cycle.

During the rotation of the cutting chain 1, the runner wheels 30 run in the runways of the head 6 (not shown) with at least one straight part parallel to the axis of the support 11 (in the unsloped position of the head 6) and extending to the upper part 58 of the said support 11, on which upper part the base of the pinion to be cut, 9, rests. In the upper part 60 of this straight part of the path (Fig. 6) there is, on either side of the head 6, a straight inside guide channel 59 in which the extensions 28 of the lateral arms 27 of the links 20 are guided positively, thus ensuring, as has already been pointed out, a total length of ride of the said links which is substantially equal to twice the pitch of the articulation of said links, and, consequently, great precision in the cutting work.

It follows, therefore, that with the device so described pinions of any desired size, whether with straight teeth or helix teeth, can be cut on a mass production basis, not only very easily but, above all, at high speed.

The kinematic chain itself is simplified by the fact that with the new device the cutting of helix teeth does not necessitate the use of the differential which is indispensable in the other known processes, in order to adjust the longitudinal forward movement to the angle of the helix to be cut.

What I claim is:

1. In a gear-cutting device comprising a continuous cutting chain adapted to have a continuous movement, the path thereof having at least one plane part, and cutting elements carried by said chain, said cutting elements comprising articulated units made up of side links and intervening base plate, an intermediate plate rotatably and slidably mounted on said base plate, means to adjust the position of said intermediate plate with reference to said base plate, parallel cutting blades having the form of a rack arranged adjacent to each other transversely to said path of the chain, means to bind together said cutting blades whereby forming a block of said blades, means to secure said block of blades to said intermediate plate, and means to secure said block of blades and said intermediate plate to said base plate, whereby allowing said blades to be aligned on said links at any suitable angle with reference to the longitudinal axis of said link and permitting of cutting gears with one or several threads.

2. In a gear cutting device as in claim 1, said base plate being provided on its upper face with a cylindrical pivot and said intermediate plate being provided in its lower face in engagement with said upper face of said base plate with a rectangular groove having a greater side and a smaller side, a bearing bush having a square section the side thereof having a length equal to the smaller side of said groove and being axially bored with a cylindrical bore the diameter thereof being equal to the diameter of said pivot, said bush being mounted on said pivot and into said intermediate plate to be rotated around said pivot and to be slidably moved in a direction parallel to the greater side of said groove.

3. In a gear-cutting device comprising a continuous cutting chain adapted to have a continuous movement, the path thereof having at least one plane part, and cutting elements carried by said chain, said cutting elements comprising articulated units made up of side links and intervening base plate, parallel cutting blades having the form of a rack arranged adjacent to each other transversely to said path of the chain, means to bind together said cutting blades whereby forming a block of said blades, means to adjustably secure said block to said base plate, said side links having opposite extensions with plane upper and lower bearings and symmetrically arranged in relation to the approximate centre of said links.

4. In a gear-cutting device as in claim 3, pins passing through continuous bores in said side links, said pins being provided with runner wheels on each side, the outer lateral surface thereof being adjacent to the inner lateral surface of said links and the upper part of said wheels being approximately level with said plane upper bearings whereby providing perfect obturation of said articulated units.

References Cited in the file of this patent

UNITED STATES PATENTS

| | | |
|---|---|---|
| 1,469,602 | Perkins et al. | Oct. 2, 1923 |
| 1,503,996 | Perkins et al. | Aug. 5, 1924 |
| 2,204,537 | Lapointe et al. | June 11, 1940 |
| 2,475,690 | Bonnafe | July 12, 1949 |
| 2,538,844 | Nimz | Jan. 23, 1951 |
| 2,585,832 | Phaneuf | Feb. 12, 1952 |

FOREIGN PATENTS

| | | |
|---|---|---|
| 667,286 | Germany | Nov. 9, 1938 |